(No Model.)  J. P. F. FLAIG.  7 Sheets—Sheet 1.
WINDMILL.
No. 590,753.  Patented Sept. 28, 1897.
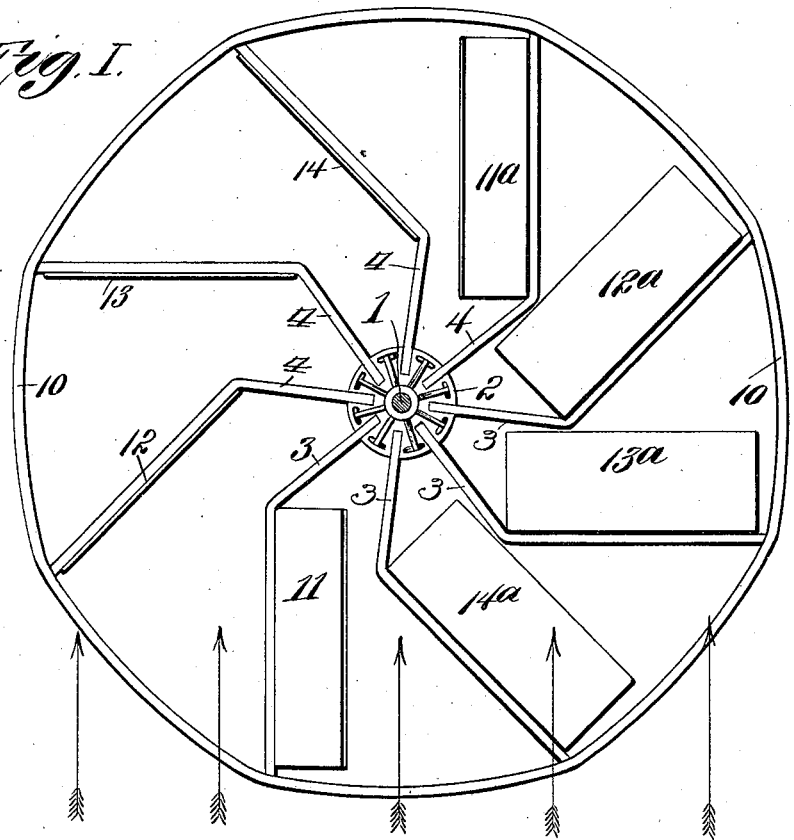
Fig. I.
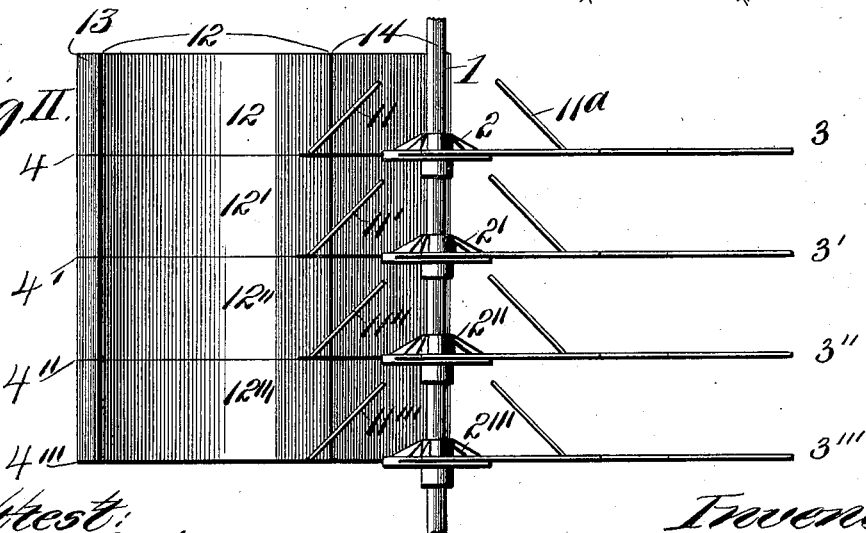
Fig. II.
Attest:  
Wm. A. Scott  
Stanley Stoner
Inventor:  
Jos. P. F. Flaig.  
By Wright & Bro.  
Attys

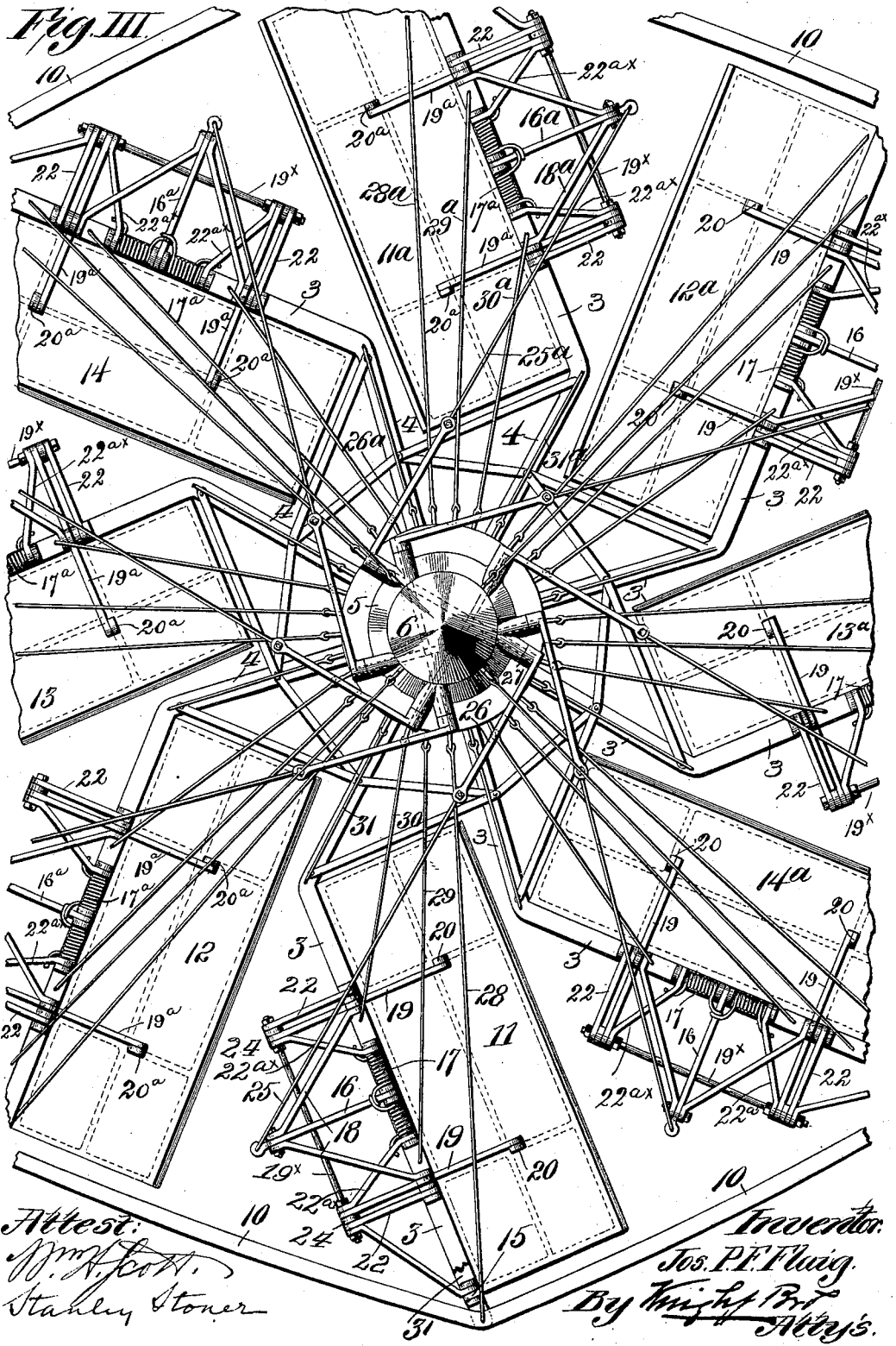

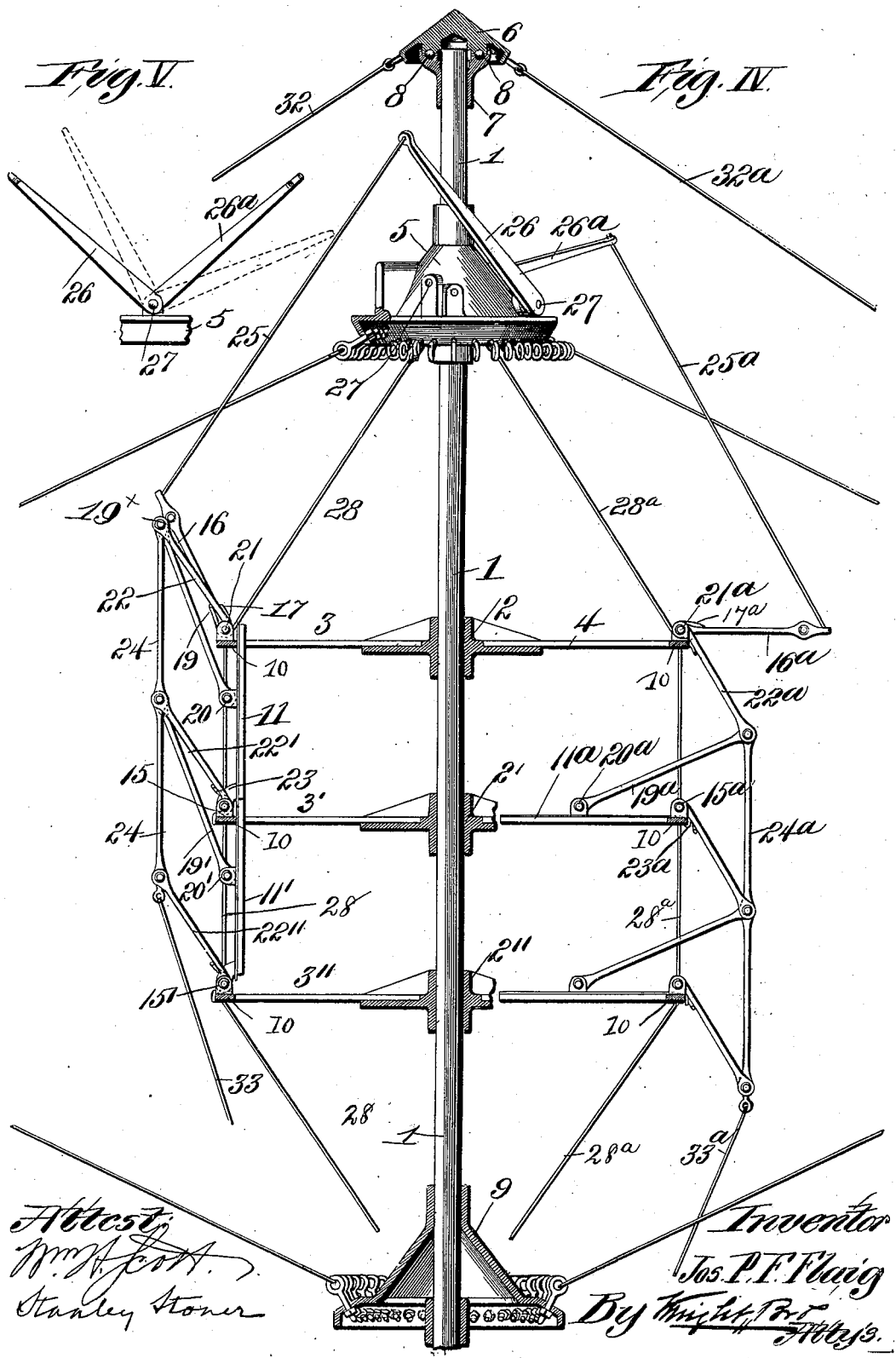

(No Model.) 7 Sheets—Sheet 4.
J. P. F. FLAIG.
WINDMILL.
No. 590,753. Patented Sept. 28, 1897.
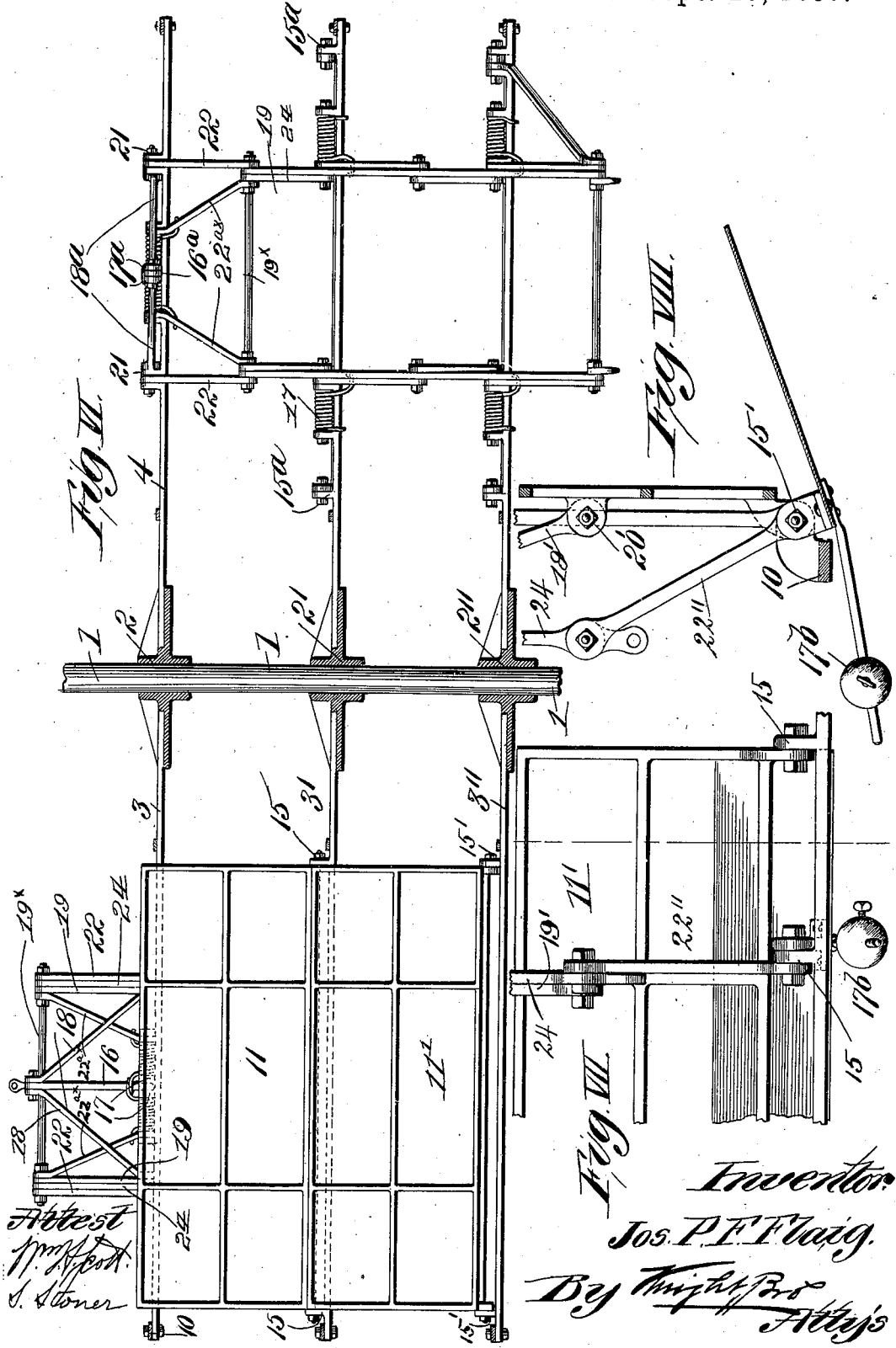

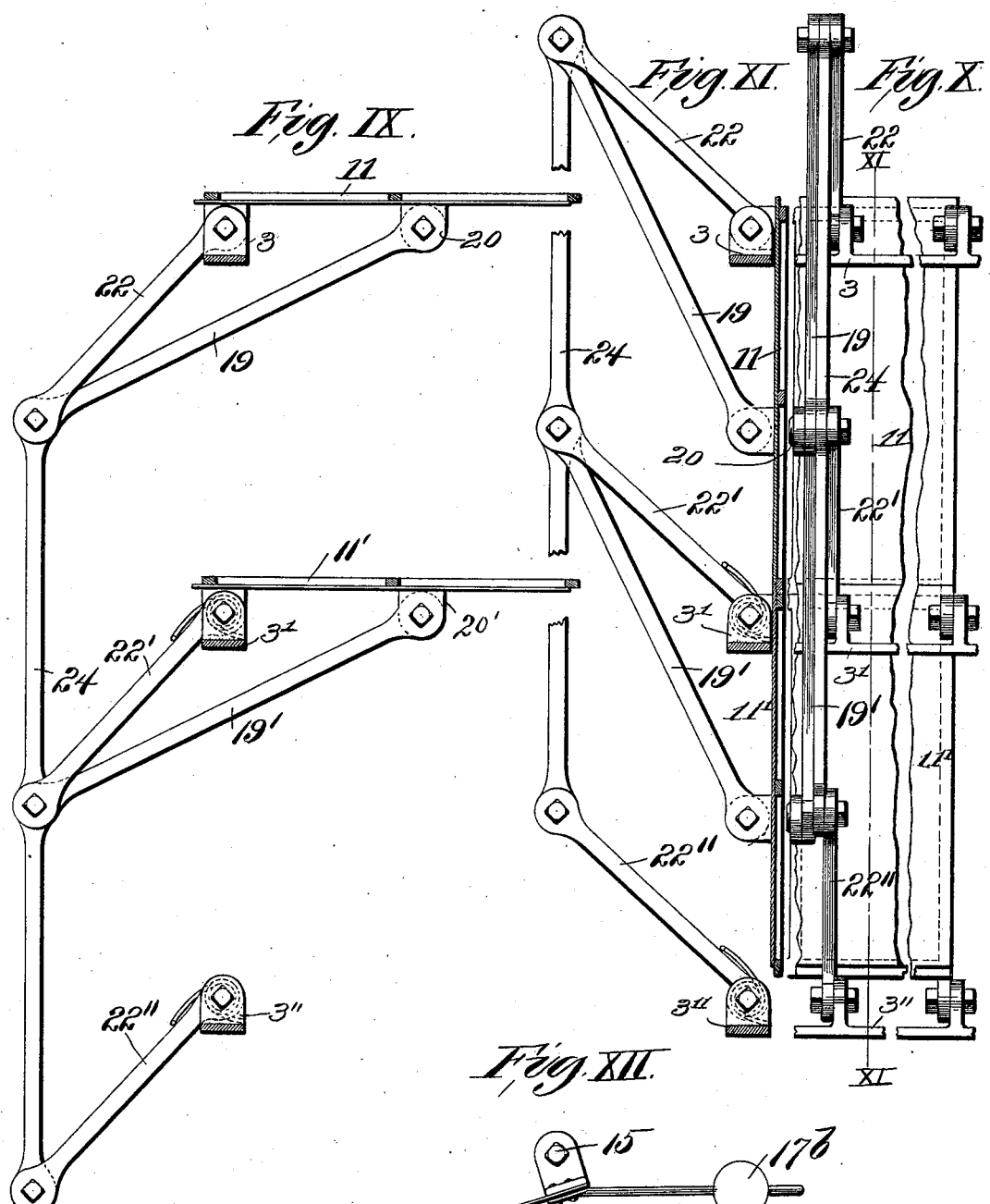

(No Model.)  
7 Sheets—Sheet 6.
J. P. F. FLAIG.
WINDMILL.
No. 590,753. Patented Sept. 28, 1897.
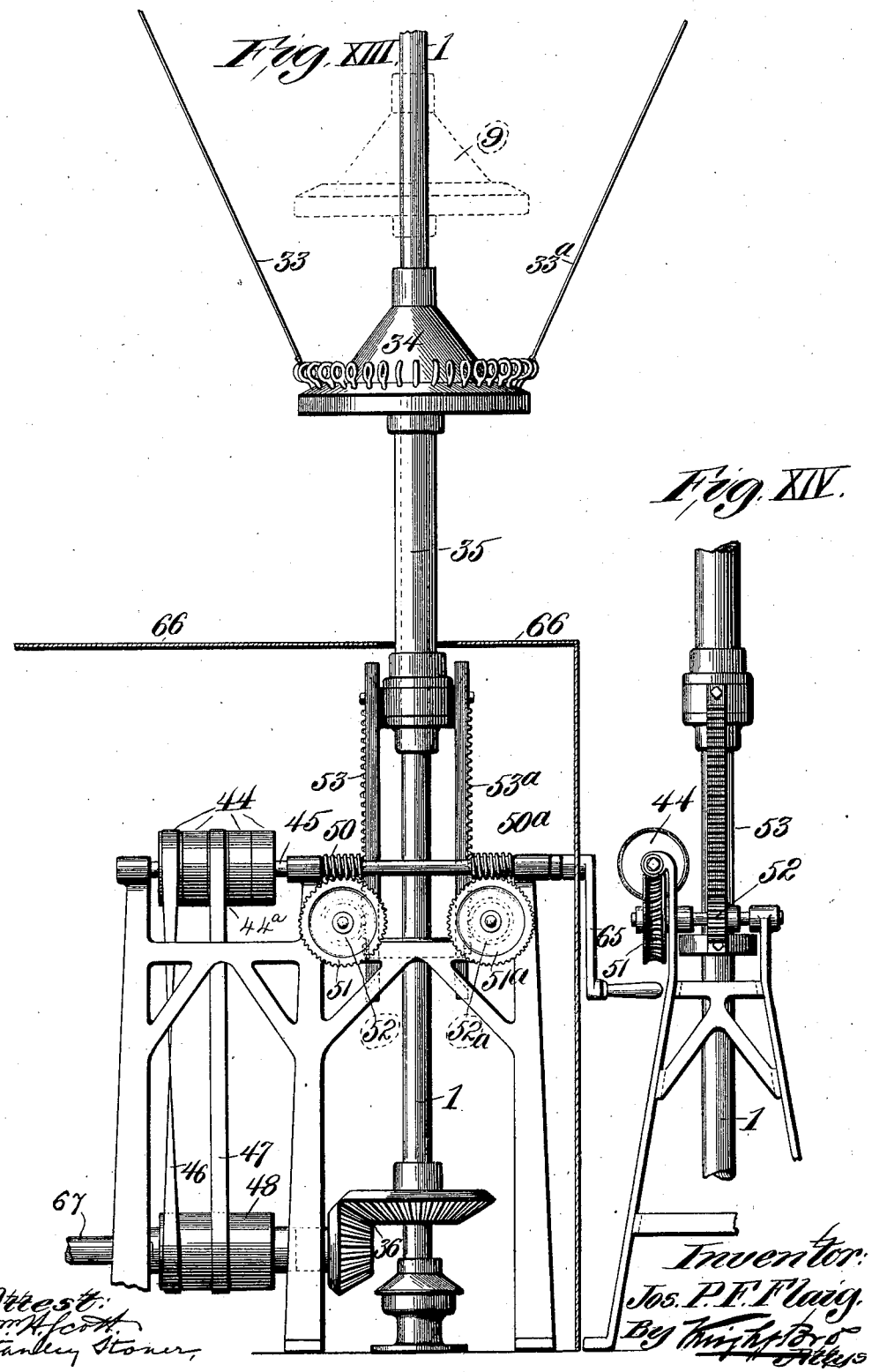

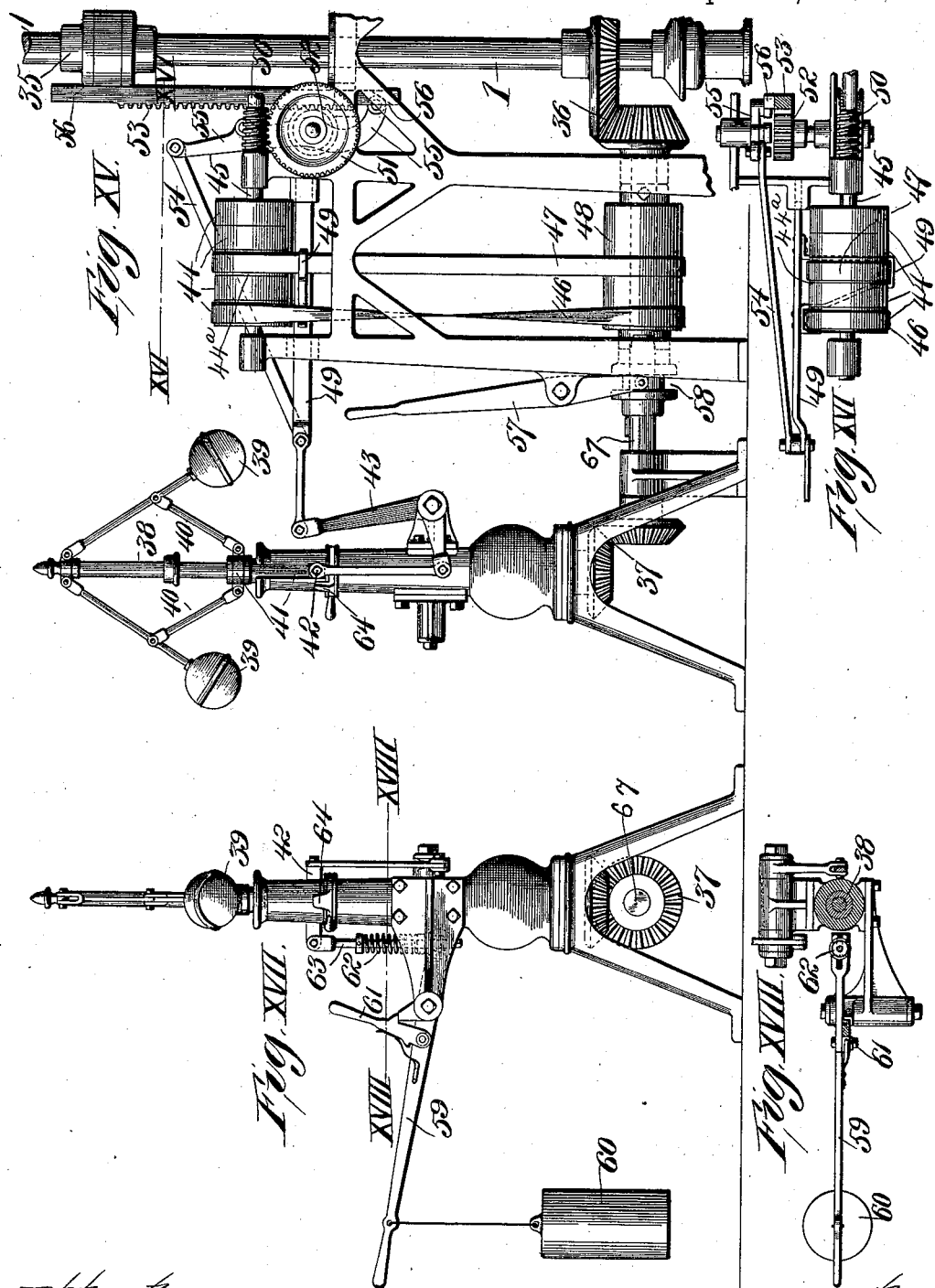

UNITED STATES PATENT OFFICE.

JOSEPH P. F. FLAIG, OF ST. LOUIS, MISSOURI.

WINDMILL.

SPECIFICATION forming part of Letters Patent No. 590,753, dated September 28, 1897.

Application filed March 6, 1896. Serial No. 582,130. (No model.)

*To all whom it may concern:*

Be it known that I, JOSEPH P. F. FLAIG, a citizen of the United States, and a resident of the city of St. Louis, in the State of Missouri, have invented a certain new and useful Improvement in Windmills, of which the following is a full, clear, and exact description, reference being had to the accompanying drawings, forming part of this specification.

The object of my invention is to provide improvements in the construction of horizontal windmills. I accomplish this object by means of the device illustrated in the accompanying drawings, in which—

Figure I is a plan view of the windmill-wheel, omitting details of construction. Fig. II is a side elevation thereof. Fig. III is a detail view of the wheel and sail-connecting devices on a larger scale. Fig. IV is a detail side view, partly in section. Fig. V is a detail view of the rocking arms, which are connected with the sails at opposite sides. Fig. VI is a detail vertical section showing a side elevation of the sails, the sails on the left side raised to receive the wind-pressure, and the sails depressed on the right side to avoid the same. Fig. VII is a detail front view, and Fig. VIII is a detail side view, showing a modified form of counterbalancing device for counteracting the weight of the sails. Fig. IX is a detail side view of the open sails and operating-levers of a modified construction adapted to allow said sails to open downward instead of, as in my preferred construction, upward. Fig. X is a detail front view, and Fig. XI is a detail vertical section taken along the line XI XI, Fig. VIII, of said modified construction, showing the sails closed. Fig. XII shows a modified form of counterbalancing device for said sails. Fig. XIII is a front elevation of the speed-regulator. Fig. XIV is a side view thereof. Fig. XV is a detail front view thereof. Fig. XVI is a plan view thereof, taken along the line XVI XVI of Fig. XV. Fig. XVII is a detail view showing an elevation of the governor. Fig. XVIII is a plan view thereof, taken along the line XVIII XVIII of Fig. XVII.

1 is the central supporting-shaft of the windmill. Secured to this shaft are supporting collars or flanges 2, 2', 2'', and 2''', the number thereof being dependent upon the number of tiers of sails used. Extending from these collars or flanges and integral therewith are a series of supporting-arms 3, 3', 3'', and 3''', and 4, 4', 4'', and 4''', which carry the sails, as will be hereinafter described.

5 is a cone secured to shaft 1, to which are attached the guy-ropes 28 28$^a$, supporting the arms 3, &c.

6 is a stationary conical cap in which the shaft 1 revolves, the said shaft being provided with a boxing 7, between which and the cap 6 are interposed ball-bearings 8.

9 is a second cone secured to shaft 1 below the sails and adapted to secure the lower guy-ropes.

10 are braces attached to the ends of the arms 3 4.

11, 11$^a$, 12, 12$^a$, 13, 13$^a$, 14, and 14$^a$ are the sails, which may be of any desired number and built in any desired number of tiers. Fig. II shows four such tiers, while Figs. IV and VI show two. Taking one sail 11 as an example, their mode of operation is as follows: The said sail is hinged to the supporting-arm 3' at 15. This arm instead of being wholly in a radial line from the central shaft 1 is bent to a tangent, as shown in Figs. I and III, to better utilize the force of the wind. Hinged to lugs 20 on the back of the sail are two arms 19, connected by a cross-bar 19*, which is hinged to rods 24, said rods 24 being long enough to extend the length of the tiers of the sails.

22 22' 22'' are rods hinged to the ends of the arms 3 3' 3'' and rod 24. It will be easily seen that these various rods and arms give a parallel-rule movement to rods 24, and that downward movement of rods 22 22' 22'' will fold the sails 11 11' inward.

Hinged to the upper arm 3 is the lever 16, Figs. IV and VI, which is held depressed by means of a coil-spring 17, one end of which bears downward against said arm and the other end upward on arm 22$^{a\times}$.

18 are trusses to prevent a sidewise movement. The end of lever 16 is connected by a rod 25 to a rocking lever 26, which is pivoted by a shaft 27, which passes through the first cone 5 at one side of the central shaft 1.

Rigid therewith is a similar rocking lever 26$^a$, which, by means of rod 25$^a$, connects with lever 16$^a$ and which is opposite to lever 16. It will thus be seen that when the lever 16 is raised the opposite lever 16$^a$ is depressed, so that when the sail 11 is raised to receive the force of the wind the opposite sail 11$^a$ is depressed to avoid the same.

28 28$^a$ are supporting-ropes securing the ends of the arms 3 and 4 to the cap 5.

29 29$^a$ 30 30$^a$ 31 31$^a$ are intermediate supporting-ropes.

32 32$^a$ are guy-rods passing from cap 6 to outer posts to steady the device.

The springs 17 hold the edges of the sails slightly above the level, so that the wind can readily raise the same. By means of the parallel-rule device already described the sails on a given tier move simultaneously. As the lever 16 is raised, carrying with it lever 26, the opposite levers 26$^a$ 16$^a$ are depressed and the opposite sails 11$^a$ are folded down out of the wind. This relative position will be maintained, for as the sail adapted to receive the force of the wind is picked up the opposite one is turned down and the revolution is accomplished.

I have described the sails as being held slightly out of the level and thereby avoiding their edges being directly presented to the wind by means of the tension of a coil-spring. The object of this is to always allow a slight purchase for the wind. This same end may be accomplished by means of a weight 17$^b$, hung on a rod to counteract the weight of the sail, as shown in Figs. VII, VIII, and XII. In these views Figs. VIII and XII I also show a modified form of sail, a single piece of sheet-steel being used instead of a sail secured to a frame, as is shown in the other figures.

The ends of the rods 24 24$^a$ are connected by means of ropes 33 33$^a$ with a third cone 34, which is rigidly secured to a sleeve 35 and which is adapted to ride up and down the shaft 1. At the bottom of said shaft 1 is a bevel-gear 36, which operates a second bevel-gear 37, the shaft connecting the two being the power-shaft of the device, which in turn revolves a shaft 38, carrying governors 39. As the windmill turns faster and faster the rapidity with which the shaft 38 revolves is increased and the governors 39 are spread. The arms 40, attached to said governors, raise a sleeve 41, and this in turn raises a pin 42, carried in a slot. As the sleeve 41 is raised the bell-crank 43 is thrust to the right, Fig. XV.

Mounted on a shaft 45 are four loose pulleys 44 and a tight pulley 44$^a$. The loose pulleys 44 are located in pairs on opposite sides of the tight pulley.

46 is a cross-belt, and 47 is a straight belt. These belts run over the pulleys 44 and 44$^a$ and also run over a loose pulley 48 on the power-shaft. The loose pulley 48 is caused to rotate with the shaft 67 by means of the clutch 58. Normally these belts run one (the crossed belt) over a loose pulley 44 and the other (the straight belt) over the tight pulley 44$^a$, but as the speed of the windmill increases and the governors, by spreading, force the bell-crank 43 to the right the belt 47, previously carried on the tight pulley 44$^a$, and the belt 46 are shifted by a belt-shifter to the right to the loose pulleys adjacent to the tight pulley. This will cause shaft 45 to cease revolving. Further shifting of the belt-shifter to the right will cause the straight belt to pass onto the innermost loose pulley and the crossed belt onto the tight pulley, when shaft 45 will rotate in the opposite direction. The said shaft 45 carries a worm 50, which is adapted to engage a worm-gear 51. Rigid to the shaft of this gear 51 is a pinion 52, which is adapted to engage a rack 53, said rack being attached to the sleeve 35. It will thus be seen that as the speed of the windmill increases and the shaft 1 revolves more and more rapidly the pinion 52 will, through the mechanism just described, pull the rack 53 and sleeve 35 downward until belt 47 is thrown from tight pulley 44$^a$ to the loose pulley 44, and the further spreading of the sails is prevented. Through the intervention of the cone 34 a pull is exerted on the rope 33, which in turn will draw down the sail 11, exposing less and less surface to the wind, thus automatically regulating the speed of the mill.

Attached to the shifter 49 is an auxiliary governor 54. This operates an arm 55, which is pivoted to the bearing of the shaft carrying the pinion 52 and which is adapted to ride on inclines 56 at the ends of the rack 53. The movement of said rack is thus limited, as when the rollers on said arm run onto said inclines the shifter 49 carries the belt 46 or 47 off the stationary pulley 44$^a$.

57 is a hand-lever which controls a clutch 58. When said clutch is in engagement, the pulley 48 is adapted to operate with its shaft. When out of engagement, pulley 48 stands still, while the power-shaft revolves. This is used to close the sails down with their edges to the wind.

59 is a lever, Figs. XVII and XVIII, carrying a weight 60 and fulcrumed to the standard of the governor. It is held in place by a catch 61, which when thrown out of engagement allows the inner end of said lever to bear against a spring 62 and rod 63, which raises the pin 42. When thus raised, the collar-rest 64 can be turned so as to be directly under the pin 42, and the pin 42 rests upon it when lowered. This places the bell-crank 43 vertical and secures the belts 46 47 upon movable pulleys 44. The regulating device may thus be temporarily thrown out of use, as when a repair is necessary and it is desired to avoid stopping the windmill.

At the end of shaft 45, opposite to the end carrying pulleys 44, is a worm 50$^a$, which can be turned by means of a hand-crank 65, Fig. XIII. This crank is used for starting and stopping the mill. If the windmill is stopped for any cause, the clutch 58 may be thrown out of engagement by means of lever 57. The rack 53ᵃ is lowered by means of the hand-crank 65, which, by means of the ropes 33 33ᵃ, closes the sails 11 from the action of the wind. The opposite motion of crank 65 raises the rack 53ᵃ and causes the mill to start. The clutch 58 avoids the necessity of turning the entire governor device while starting the mill, but said governor device may be immediately thrown into use by means of lever 57.

66 is a casing to protect the regulating device from inclement weather.

The power-shaft 67 is not shown connected with any operating device, but any of the ordinary means for utilizing motion may be used.

I prefer to construct the sails with a frame, to which is attached a sheet of metal, cloth, wood, or any other suitable material; but I do not limit myself to this means, as a single sheet of metal or wood may be used without the said frame.

I claim as my invention—

1. A horizontal windmill comprising a wheel having sails, arranged in series and in tiers and hinge connection between the tiers, each consisting of lugs 20, arms 19, cross-bar 19*, vertical rods 24, and the hinge-rods; substantially as described.

2. A horizontal windmill comprising a wheel having sails, a vertical shaft having arms on which the sails are hinged, a cone secured to the shaft, and rocking levers pivoted to the cone and means whereby the opposite sails are alternately raised and lowered; substantially as described.

3. The combination of horizontally-revolving sails, the opening of which is controlled by connecting them to a sleeve riding on the central shaft of the mill, a rack attached to said sleeve, a governor controlled by the revolution of said shaft, and a pinion controlled by said governor and adapted to control the movement of said rack, substantially as described.

4. The combination of a belt-shifter controlled by a governor, a shaft carrying fixed and movable pulleys and controlling a pinion, a rack which said pinion engages, sails controlled by the movement of said rack, and a means whereby said shifter throws a belt on or off said fixed pulley, adapted to control the windmill, substantially as described.

JOS. P. F. FLAIG.

In presence of—
   STANLEY STONER,
   E. S. KNIGHT.